US010892950B2

(12) United States Patent
Sherman et al.

(10) Patent No.: US 10,892,950 B2
(45) Date of Patent: Jan. 12, 2021

(54) DISTRIBUTED GLOBAL DISCOVERY SERVERS IN OPERATIONAL TECHNOLOGY INFRASTRUCTURE

(71) Applicant: Microsoft Technology Licensing, LLC, Redmond, WA (US)

(72) Inventors: Gary Sherman, Munich (DE); Martin Hans Anton Regen, Allgäu (DE); Daniele Colonna, Munich (DE); Johann Gschossmann, Munich (DE); Marc-Andre Schier, Munich (DE); Erich Martin Barnstedt, Erichb (DE)

(73) Assignee: Microsoft Technology Licensing, LLC, Redmond, WA (US)

( * ) Notice: Subject to any disclaimer, the term of this patent is extended or adjusted under 35 U.S.C. 154(b) by 476 days.

(21) Appl. No.: 15/945,072

(22) Filed: Apr. 4, 2018

(65) Prior Publication Data

US 2019/0166004 A1   May 30, 2019

Related U.S. Application Data

(60) Provisional application No. 62/590,434, filed on Nov. 24, 2017.

(51) Int. Cl.
*G06F 15/173* (2006.01)
*H04L 12/24* (2006.01)
(Continued)

(52) U.S. Cl.
CPC .......... *H04L 41/12* (2013.01); *H04L 9/3263* (2013.01); *H04L 9/3268* (2013.01);
(Continued)

(58) Field of Classification Search
CPC ....... H04L 41/12; H04L 69/26; H04L 63/062; H04L 9/3268; H04L 67/12; H04L 9/3263
See application file for complete search history.

(56) References Cited

U.S. PATENT DOCUMENTS

| 10,545,492 | B2 * | 1/2020 | Billi-Duran ...... G05B 19/41885 |
| 2017/0006022 | A1 | 1/2017 | Gunti et al. |
| 2017/0006030 | A1 | 1/2017 | Krishnamoorthy et al. |

FOREIGN PATENT DOCUMENTS

EP   2093678 A1   8/2009

OTHER PUBLICATIONS

"International Search Report and Written Opinion Issued in PCT Application No. PCT/US2018/061717", dated Feb. 28, 2019, 13 Pages.

(Continued)

*Primary Examiner* — Oleg Survillo
(74) *Attorney, Agent, or Firm* — Liang IP, PLLC

(57) ABSTRACT

Cloud-assisted computing systems, devices, and associated methods of global discovery services are disclosed herein. In one embodiment, a computing device of a processing plant in an operational technology ("OT") infrastructure is configured to upon detecting a data server is connected to the OT network in a processing plant, collect, from the detected data server, data representing a configuration of the data server and transmit a registration request containing the collected data to a cloud computing system via a secure connection to register the detected data server as a data source in the OT infrastructure. The computing device can then receive a registration confirmation indicating that the configuration of the data server is stored in the cloud computing system and is discoverable by client devices at other processing plants in the OT infrastructure.

20 Claims, 10 Drawing Sheets

(51) Int. Cl.
H04L 29/06 (2006.01)
H04L 9/32 (2006.01)
H04L 29/08 (2006.01)

(52) U.S. Cl.
CPC .......... H04L 63/062 (2013.01); H04L 67/12 (2013.01); H04L 69/26 (2013.01); H04L 67/10 (2013.01)

(56) References Cited

OTHER PUBLICATIONS

"Cimplicity 9.5 from GE Digital", Retrieved from: <<https://www.ge.com/digital/sites/default/files/cimplicity-from-ge-digital-datasheet.pdf>>, Retrieved on: Mar. 1, 2018, 3 Pages.
Cheshire, et al., "Dynamic Configuration of IPv4 Link-Local Addresses", Retrieved from: <<http://www.ietf.org/rfc/rfc3927.txt >>, May 2005, 27 Pages.
"ISA-95 Common Object Model", Retrieved from: <<https://opcfoundation.org/developer-tools/specifications-unified-architecture/isa-95-common-object-model/>>, Oct. 30, 2013, 2 Pages.
"OPC Unified Architecture / PLCopen Information Model", Retrieved from: <<https://opcfoundation.org/developer-tools/specifications-unified-architecture/opc-unified-architecture-plcopen-information-model/ >>, Retrieved on: Mar. 1, 2018, 2 Pages.
"OPC Unified Architecture for Analyzer Devices (ADI)", Retrieved from: <<https://opcfoundation.org/developer-tools/specifications-unified-architecture/opc-unified-architecture-for-analyzer-devices-adi/ >>, Jan. 9, 2015, 2 Pages.
"OPC Unified Architecture for Devices (DI)", Retrieved from: <<https://opcfoundation.org/developer-tools/specifications-unified-architecture/opc-unified-architecture-for-devices-di/ >>, Jul. 25, 2013, 2 Pages.
"OPC Unified Architecture for FDI", Retrieved from: <<https://opcfoundation.org/developer-tools/specifications-unified-architecture/opc-unified-architecture-for-fdi/ >>, Sep. 7, 2017, 2 Pages.
"OPCFoundation/UA-.NETStandard", Retrieved from: <<https://github.com/OPCFoundation/UA-.NETStandard/tree/master/SampleApplications/Samples/GDS>>, Retrieved on: Mar. 1, 2018, 5 Pages.
"RSA", Retrieved from: <<http://www.emc.com/emc-plus/rsa-labs/pkcs/files/h11301-wp-pkcs-12v1-1-personal-information-exchange-syntax.pdf >>, Retrieved on: Mar. 1, 2018, 5 Pages.
Cheshire, et al., "DNS-Based Service Discovery", Retrieved from: <<http://www.ietf.org/rfc/rfc6763.txt >>, Feb. 2013, 40 Pages.
Cheshire, et al., "Multicast DNS", Retrieved from: <<http://www.ietf.org/rfc/rfc6762.txt >>, Feb. 2013, 57 Pages.
Droms, R, "Dynamic Host Configuration Protocol", Retrieved from: <<http://www.ietf.org/rfc/rfc2131.txt>>, Mar. 1997, 37 Pages.
Geissbauer, et al., "Industry 4.0: Building the digital enterprise", Retrieved from: <<https://www.pwc.com/gx/en/industries/industries-4.0/landing-page/industry-4.0-building-your-digital-enterprise-april-2016.pdf>>, Apr. 2016, 36 Pages.
Kaliski, B, "Public-Key Cryptography Standards (PKCS) #8", Retrieved from: <<http://www.ietf.org/rfc/rfc5208.txt >>, May 2008, 7 Pages.
Mockapetris, P, "Domain Names—Implementation and Specification", Retrieved from: <<http://www.ietf.org/rfc/rfc1035.txt >>, Nov. 1987, 45 Pages.
Nystrom, et al., "PKCS #10: Certification Request Syntax Specification", Retrieved from: <<http://www.ietf.org/rfc/rfc2986.txt >>, Nov. 2000, 12 Pages.
Pritikin, et al., "Enrollment over Secure Transport", Retrieved from: <<http://www.ietf.org/rfc/rfc7030.txt>>, Oct. 2013, 44 Pages.

\* cited by examiner

DISTRIBUTED GLOBAL DISCOVERY SERVERS IN OPERATIONAL TECHNOLOGY INFRASTRUCTURE

CROSS-REFERENCE TO RELATED APPLICATION(S)

This application is a non-provisional of and claims priority to U.S. Provisional Application No. 62/590,434, filed on Nov. 24, 2017, the disclosure of which is incorporated herein in its entirety.

BACKGROUND

Operational technology ("OT") generally refers to utilizing computer hardware and software to monitor sensors and material handling equipment (e.g., control valves and pumps) in a processing facility in order to maintain or change operations of the processing plant. OT can be applied in power generation, chemical processing, oil and gas production, waste management, water treatment, and other processes. Example OT systems can include one or more supervisory control and data acquisition ("SCADA") systems, distributed control systems ("DCSs"), remote terminal units ("RTUs"), programmable logic controllers ("PLCs"), as well as dedicated computer networks. Embedded systems (e.g. SMART instrumentation) along with a large groups of scientific data acquisition, control, and computing devices are also considered a part of OT systems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

One challenge in deploying OT systems in process control and automation is interoperability. Equipment provided by one manufacturer may not operate properly with equipment provided by another. For example, PLCs manufactured by one company may not communicate properly with sensors, transmitters, or other processing equipment by other companies due to differences in communication protocols. As such, a standard set of objects, programming interfaces, and methods can greatly facilitate interoperability of processing components.

Object Linking and Embedding ("OLE") for Process Control ("OPC") is a series of standards and specifications for industrial telecommunication and automation that can improve interoperability. For example, OPC Unified Architecture ("UA") is a platform-independent machine-to-machine interoperability standard for industrial automation developed by the OPC Foundation. Through OPC UA, various systems and devices can communicate with one another by sending request and receive response messages between OPC clients and OPC servers. For example, an OPC client (e.g., a supervisory control station) can establish a secure connection with an OPC server (e.g., a pressure transmitter) in order to receive process data (e.g., pressure readings) from the OPC server. In the client-server model, OPC defines sets of services, such as data access that OPC servers can provide. Information is conveyed using OPC UA-defined and vendor-defined data types and server-defined object models that OPC clients can dynamically discover. As such, OPC servers can provide access to both current and historical data, as well as alarms and events to notify OPC clients of important changes.

To accommodate efficient establishment of communications between pairs of OPC servers and clients, the OPC UA also defines a discovery process that allows OPC clients to find OPC servers on an OT network and then discover how to connect to the OPC servers. For example, a Global Discovery Server ("GDS") can maintain OPC UA server discovery information available in an administrative domain for OPC UA clients. Such GDSs, however, are typically located and run inside a factory or a production facility to manage device registration and security on a factory floor. Device registration information is typically stored in a local database, and a certificate authority ("CA") running on the GDS issues and signs certificates with a private key stored in the local GDS. Each factory or even a portion of the factory may run a corresponding GDS to manage such registration and security operations.

Such local implementation of GDS can present certain operational and security drawbacks. For example, factories or production facilities of a single company can be distributed worldwide. As such, multiple isolated GDSs may need to be deployed in different geographical locations to individually manage local device registration and security. Such deployment can add to capital costs as well as costs for administration and maintenance. Also, local administrators of GDS may even choose not to use a GDS or disable security on the GDS due to complexities of related setup operations. In addition, the isolated GDSs cannot provide registration information of OPC servers in one facility to OPC clients in other facilities, and thus can hinder the generation of a globalized view of process conditions from multiple factories. In addition, running a CA within a local GDS on a factory floor may present a security risk for unauthorized access. For example, an unauthorized person using a removable flash drive can gain access to a private key of the CA by copying data to the removable flash drive.

Several embodiments of the disclosed technology can address certain aspects of the foregoing drawbacks by implementing and extending certain functionalities of a local GDS to a cloud computing system. A GDS with access to such functionalities extended to the cloud computing system is referred to herein as a cloud-assisted GDS. For example, the cloud computing system can be configured to provide cloud services such as a cloud device registry to facilitate device registration of OPC servers. The registration information can include data representing registered OPC servers from multiple factories from different geographical locations and corresponding device information both stored in the cloud computing system. In another example, cloud computing system can also be configured to provide a cloud-based CA service having a corresponding private key stored in special hardware-backed secure storage for issuing security certificates to OPC servers with control via a cloud-based administration shell. In further examples, the cloud computing system can also be configured to provide additional and/or different cloud services to facilitate operations of a cloud-assisted GDS.

In certain embodiments, a cloud-assisted GDS can be configured to deploy certain local GDS services (e.g. by executing an application or one or more software components in a Docker container) on a suitable edge device (e.g., a physical server or desktop computer) in each of the factories to interface with OT systems in the factories. The local GDS services can be configured to implement certain business logics such as those to provide facilities for device registration, certificate generation/update, and trusted device updates. The local GDS services can also be configured to provide (i) OPC UA interfaces to the OPC servers and OPC clients in corresponding factories and (ii) a secure network interface connected to the cloud device registry, the cloud-based CA service, and the cloud-based administration shell or other suitable cloud-assisted GDS services via a cloud hub at the cloud computing system. As described below, the local edge device does not contain any data of the OPC server device registry nor the private key that the cloud-based CA uses to issue security certificates. Thus, the risk of local unauthorized access may be reduced. In other embodiments, at least some or all of software components implementing the business logics can also be deployed in the cloud computing system instead of the edge device. In such embodiments, the local GDS services can be configured to receive and forward requests/responses to the business logics from OPC servers and OPC clients to the cloud computing system in addition to providing the OPC UA interfaces to the OPC servers and OPC clients.

In operation, the cloud-assisted GDS at the edge device can be configured to facilitate, inter alia, device registration operations for individual OPC servers from individual factories. In certain embodiments, a global discovery client running on the edge device can collect and transmit suitable device information of an OPC server to the cloud-assisted GDS. The global discovery client can also request the cloud-assisted GDS to register the OPC server as an authorized device. The cloud-assisted GDS can be configured to transmit, via the secure connection, the device information of the OPC server to the cloud device registry and request administrator approval of the device registration via the cloud administration shell. Once approved by an administrator via the cloud administration shell, by another cloud service (e.g., Microsoft Azure® Device provision service), or automatically the cloud device registry can register the OPC server and store the received corresponding device information in the cloud computing system. The cloud device registry can also make the OPC server and the corresponding device information visible to OPC clients across multiple factories or production facilities. The cloud device registry can also be configured to facilitate query operations by OPC clients for establishing secure connections to select OPC servers registered with the cloud device registry. In other embodiments, the cloud-assisted GDS can also be configured to facilitate certificate issuance/renewal, trusted device list update, and/or other suitable operations related to the OPC servers/clients, as discussed in more detail with reference to the Detailed Description section.

Several embodiments of the disclosed technology can thus reduce capital costs and the costs of maintaining local databases for OPC device registration and other operations by shifting certain tasks to the cloud computing system. Thus, in certain implementations, the only local configuration is a connection string between the cloud-assisted GDS and the cloud computing system, or a device certificate or other means to authenticate the identity of the GDS against the cloud services. Shifting the foregoing tasks to the cloud computing system can also improve security by providing a unified secure interface to the local GDS services. In addition, the cloud-assisted GDS becomes truly global. An administrator with access to the cloud-based administration shell can thus manage all OPC devices of an organization worldwide.

DETAILED DESCRIPTION

Figure 1:
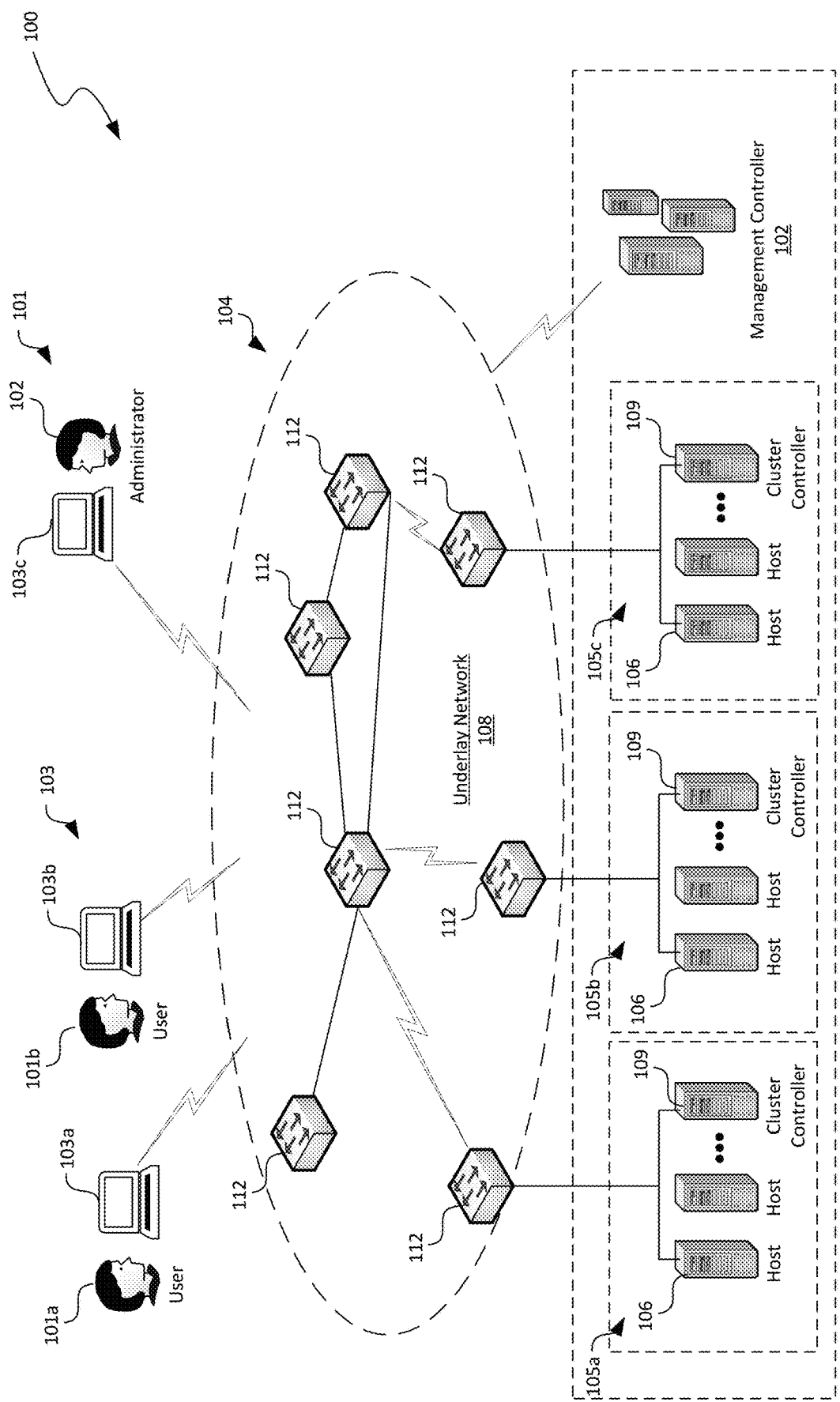
FIG. 1 is a schematic diagram illustrating a cloud computing system suitable for implementing certain cloud services for an operational technology architecture in accordance with embodiments of the disclosed technology.

Certain embodiments of systems, devices, components, modules, routines, data structures, and processes for providing distributed global discovery services in an operational technology infrastructure are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-10.

As used herein, a "cloud computing system" or a "cloud" generally refers to an interconnected computer network having a plurality of network devices that interconnect a plurality of servers or hosts to one another or to external networks (e.g., the Internet). At least some of the servers or hosts can be located in, for example, different datacenters at diverse geographical locations. A cloud can be public when accessible to the general public, or can be private when only accessible to members of an organization.

The term "network device" generally refers to a physical network device, examples of which include routers, switches, hubs, bridges, load balancers, security gateways, or firewalls. A "host" generally refers to a computing device configured to implement, for instance, one or more virtual machines or other suitable virtualized components. For example, a host can include a server having a hypervisor configured to support one or more virtual machines or other suitable types of virtual components. The one or more virtual machines can be used to execute suitable applications or computer programs to provide corresponding cloud services.

Also used herein, the term "cloud service" or "cloud computing service" generally refers to computing resources provided over a computer network such as the Internet. Common examples of cloud services include software as a service ("SaaS"), platform as a service ("PaaS"), and infrastructure as a service ("IaaS"). SaaS is a software distribution technique in which software applications are hosted by a cloud service provider in, for instance, datacenters, and accessed by users over a computer network. PaaS generally refers to delivery of operating systems and associated services over the computer network without requiring downloads or installation. IaaS generally refers to outsourcing equipment used to support storage, hardware, servers, network devices, or other components, all of which are made accessible over a computer network.

OPC UA is a platform-independent machine to machine interoperability standard for industrial automation developed by the OPC Foundation. Through OPC UA, various systems and devices can communicate with one another by sending request and receive response messages between OPC clients and OPC servers. To accommodate efficient establishment of communications between pairs of OPC servers and clients, a Global Discovery Server ("GDS") can maintain discovery information of registered OPC servers. However, such a GDS is typically implemented locally on a factory floor, referred to herein as local GDS.

Such local implementation of GDS can present certain drawbacks. For example, isolated local GDSs may need to be deployed around the World for individually managing local device registration and security when a company have multiple factories or production facilities worldwide. Such deployment can thus add to capital costs as well as costs for administration and maintenance. Also, local administrators of a local GDS may even choose not to use a local GDS or to disable security on the local GDS due to complexities of related setup operations. In addition, the isolated local GDSs cannot provide registration information of OPC servers in one facility to OPC clients in other facilities. Thus, generation of a globalized view of process conditions in all the factories may be difficult. In addition, running a local certificate authority (CA) within a local GDS on a factory floor may present a security risk for unauthorized access. For example, an unauthorized person can copy data representing the private key of the local CA onto a removable flash drive and smuggle the flash drive outside the factory.

Several embodiments of the disclosed technology can address certain aspects of the foregoing drawbacks by implementing a cloud-assisted GDS for one or more factories. In certain embodiments, a cloud-assisted GDS can utilize certain cloud services provided by a cloud computing system, such as a cloud device registry containing records of OPC servers and corresponding registration information from multiple factories at different geographical locations. The cloud-assisted GDS can also cooperate with a cloud CA service with a corresponding private key stored in a special hardware-backed secure storage in the cloud computing system for issuing digital security certificates based on the private key with control via a cloud-based administration shell. As such, several embodiments of the disclosed technology can reduce capital costs and costs of maintaining local GDSs. Shifting the security operations to the cloud computing system can also improve security by providing a unified secure interface to the OPC servers/clients. In addition, the cloud-assisted GDS can allow an administrator with access to the cloud-based administration shell to manage all OPC devices worldwide, as described in more detail below with reference to FIGS. 1-10.

FIG. 1 is a schematic diagram illustrating a cloud computing system 100 implementing certain cloud services for an operational technology architecture in accordance with embodiments of the disclosed technology. As shown in FIG. 1, the cloud computing system 100 can include an underlay network 108 interconnecting a plurality of client devices 103 (shown as first, second, and third client devices 103a-103c, respectively) of corresponding users 101 (shown as first, second, and third user 101a-101c, respectively) and a computing fabric 104. Even though particular components are shown in FIG. 1, in other embodiments, the cloud computing system 100 can also include additional and/or different constituents. For example, the cloud computing system 100 can include network storage devices, utility infrastructures, and/or other suitable components in addition to or in lieu of those shown in FIG. 1.

The client devices 103 can each include a computing device or embedded electronic device that facilitates corresponding users 101 to access cloud services provided by the hosts 106 via the underlay network 108. For example, in the illustrated embodiment, the client devices 103 individually include a desktop computer. In other embodiments, the client devices 103 can also include laptop computers, tablet computers, smartphones, PLCs, DCSs, or other suitable computing devices. Even though three users 101 are shown in FIG. 1 for illustration purposes, in other embodiments, the cloud computing system 100 can facilitate any suitable number of users 101 to access suitable types of cloud computing services provided by the hosts 106.

As shown in FIG. 1, the underlay network 108 can include one or more physical network devices 112 that interconnect the client devices 103 and the computing fabric 104. Examples of the network devices 112 can include routers, switches, firewalls, load balancers, or other suitable network components. Even though particular connection scheme is shown in FIG. 1 for illustration purposes, in other embodiments, the network devices 112 can be operatively coupled in a hierarchical, flat, "mesh," or other suitable topologies.

The computing fabric 104 can include a management controller 102 and a plurality of hosts 106 operatively coupled to one another by the network devices 112. In certain embodiments, the hosts 106 can individually include a physical server or a computing blade having several physical servers. In other embodiments, the hosts 106 can also include one or more physical servers with multiple processor cores, or other suitable types of computing devices. The hosts 106 can also individually include one or more non-volatile data storage device, computer memories, network interface cards, and/or other suitable computing components.

The hosts 106 can be organized into racks, availability zones, groups, sets, computing clusters, or other suitable divisions. For example, in the illustrated embodiment, the hosts 106 are grouped into three computing clusters 105 (shown individually as first, second, and third computing clusters 105a-105c, respectively), which are operatively coupled to corresponding network devices 112 in the underlay network 108. Even though three computing clusters 105 are shown in FIG. 1 for illustration purposes, in other embodiments, the computing fabric 104 can include one, two, eight, sixteen, or any other suitable numbers of computing clusters 105 with similar or different components and/or configurations.

Each cluster 105 can also include a cluster controller 109 configured to monitor status and manage operations of the hosts 106 in the corresponding computing cluster 105. For example, the cluster controller 109 can monitor whether a host 106 or components thereof has failed. In response to detecting a failure of the host 106 or components thereof, the cluster controller 109 can attempt to remedy the detected failure by, for instance, migrating virtual machines hosted on the failed host 106 to other hosts 106 in the same cluster 105, restarting the failed host 106, replacing hardware components of the failed host 106, and/or perform other suitable operations. Though the cluster controllers 109 are shown as separate physical servers in FIG. 1, in other embodiments, the cluster controllers 109 can also include computing services provided by one or more of the hosts 106 in corresponding computing clusters 105.

The management controller 102 can be configured to monitor, control, or otherwise manage operations of the computing clusters 105. For example, in certain embodiments, the management controller 102 can include a fabric controller configured to manage processing, storage, communications, or other suitable types of hardware resources in the computing clusters 105 for hosting desired computing services. In other embodiments, the management controller 102 can also include a datacenter controller, application delivery controller, or other suitable types of controller. In the illustrated embodiment, the management controller 102 is shown as being separate from the computing clusters 105. In other embodiments, the management controller 102 can include one or more hosts 106 in the computing clusters 105. In further embodiments, the management controller 102 can include software services hosted on one or more of the hosts 106 in the computing clusters 105.

Figure 2:
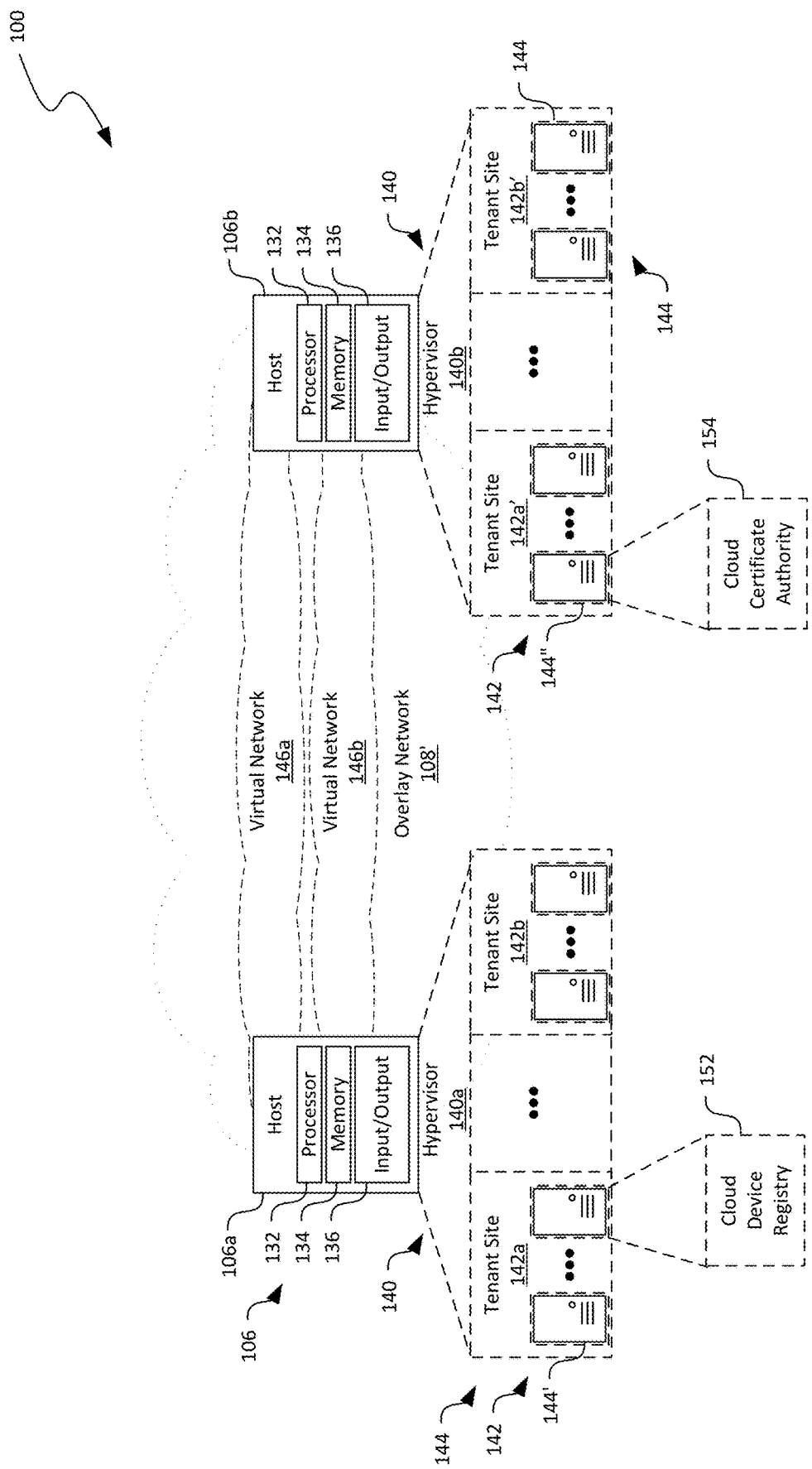
FIG. 2 is a schematic diagram illustrating certain hardware/software components of the cloud computing system of FIG. 1 in accordance with embodiments of the disclosed technology.

The cloud computing system 100 can be configured to provide certain cloud services or functionalities, such as OPC server discovery services, to OPC clients in corresponding factories or production facilities. In certain embodiments, one or more such functionalities of the cloud-assisted GDS 110 can be provided as one or more computing services hosted on one or more of the hosts 106 in the computing fabric 104, as shown in FIG. 2. In other embodiments, one or more of the functionalities can be hosted on dedicated hosts 106 (not shown) or be hosted in other suitable manners. Certain example hardware and software components of the cloud computing system 100, associated cloud services, and details of operations are described in more detail below with reference to FIGS. 2-10.

FIG. 2 is a schematic diagram illustrating certain hardware/software components of the cloud computing system 100 of FIG. 1 in accordance with embodiments of the disclosed technology. In FIG. 2, only certain components of the cloud computing system 100 of FIG. 1 are shown for clarity. For example, only first and second hosts 106a and 106b are shown in FIG. 2 for illustration purposes.

As shown in FIG. 2, the first host 106a and the second host 106b can each include a processor 132, a memory 134, and an input/output component 136 operatively coupled to one another. The processor 132 can include a microprocessor, a field-programmable gate array, and/or other suitable logic devices. The memory 134 can include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the processor 132 (e.g., instructions for performing the methods discussed herein). The input/output component 136 can include a network interface card or other suitable types of input/output devices configured to accept input from and provide output to an operator and/or an automated software controller (not shown).

The memory 134 of the first and second hosts 106a and 106b can include instructions executable by the corresponding processors 132 to cause the individual hosts 106 to provide a hypervisor 140 (identified individually as first and second hypervisors 140a and 140b) and other suitable virtual components such as virtual network interface card, virtual switches, etc. (not shown). The hypervisors 140 can individually be configured to initiate, monitor, terminate, and/or otherwise locally manage one or more virtual machines 144 organized into tenant sites 142. For example, as shown in FIG. 2, the first host 106a can provide a first hypervisor 140a that manages first and second tenant sites 142a and 142b, respectively, for the same or different tenants or users 101 (FIG. 1). The second host 106b can provide a second hypervisor 140b that manages first and second tenant sites 142a' and 142b', respectively.

The hypervisors 140 can be software, firmware, or hardware components. The tenant sites 142 can each include multiple virtual machines 144 or other suitable tenant instances for a tenant. For example, the first host 106a and the second host 106b can both host the tenant site 142a and 142a' for a first user 101a. The first host 106a and the second host 106b can both host the tenant site 142b and 142b' for a second user 101b (FIG. 1). Each virtual machine 144 can be executing a corresponding operating system, middleware, and/or applications. For example, as shown in FIG. 2, the virtual machine 144 of the first host 106a can be configured to execute suitable instructions to provide a cloud device registry 152 while another virtual machine 144 at the second host 106b can be configured to execute suitable instructions to provide a cloud certificate authority 154, as described in more detail below with reference to FIG. 3. In other examples, a container (e.g., a Docker) hosted on the individual hosts 106 can also be configured to provide the one or more computing services (e.g., cloud device registry 152, shown in FIG. 3) suitable for facilitating operations of a cloud-based cloud-assisted GDS 110 (shown in FIG. 3).

Also shown in FIG. 2, the cloud computing system 100 can include one or more virtual networks 146 that interconnect the tenant sites 142a and 142b across multiple hosts 106. For example, a first virtual network 142a interconnects the first tenant sites 142a and 142a' at the first host 106a and the second host 106b. A second virtual network 146b interconnects the second tenant sites 142b and 142b' at the first host 106a and the second host 106b. Even though a single virtual network 146 is shown as corresponding to one tenant site 142, in other embodiments, multiple virtual networks 146 (not shown) may be configured to correspond to a single tenant site 146.

The virtual machines 144 (or containers) on the virtual networks 146 can communicate with one another via the underlay network 108 (FIG. 1) even though the virtual machines 144 are located on different hosts 106. Communications of each of the virtual networks 146 can be isolated from other virtual networks 146. In certain embodiments, communications can be allowed to cross from one virtual network 146 to another through a security gateway or otherwise in a controlled fashion. A virtual network address can correspond to one of the virtual machine 144 in a virtual network 146. Thus, different virtual networks 146 can use one or more virtual network addresses that are the same. Example virtual network addresses can include IP addresses, MAC addresses, and/or other suitable addresses.

Figure 3:
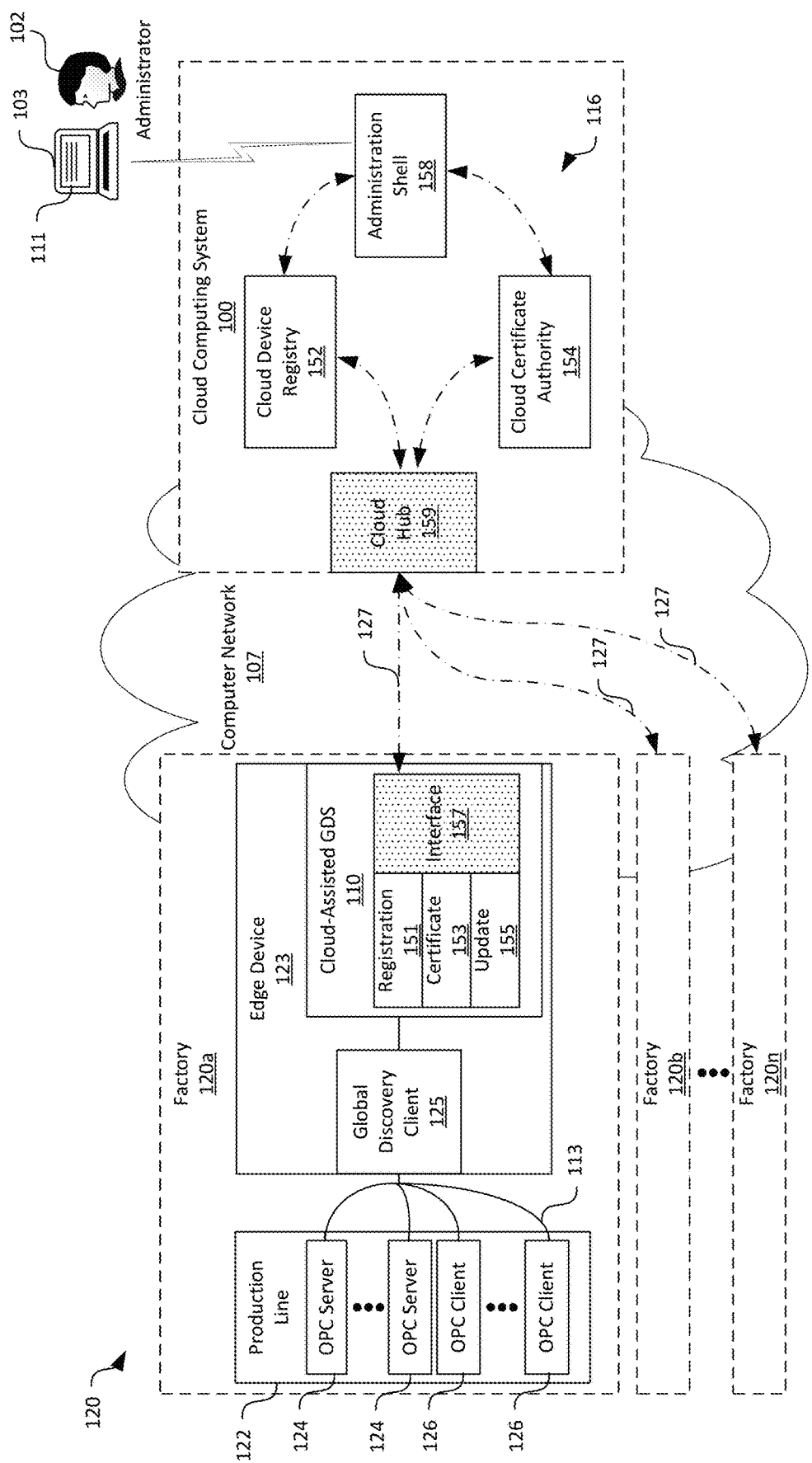
FIG. 3 is a schematic diagram illustrating certain components of a global discovery server in accordance with embodiments of the disclosed technology.

FIG. 3 is a schematic diagram illustrating certain components of the cloud computing system 100 in FIG. 2 operatively coupled to multiple factories 120 with cloud-assisted GDS 110 via secured connections 127 in accordance with embodiments of the disclosed technology. The factories 120 can individually include a processing plant, a portion of a processing plant, or other suitable divisions of a processing plant of a suitable type. Example types include power generation, chemical processing, oil and gas production, waste management, and water treatment. The factories 120 can be physically located at the same or different geographical locations.

Also shown in FIG. 3, the factories 120 can individually include a factory OT network 113 interconnecting a production line 122 having one or more OPC servers 124 and OPC clients 126 and an edge device 123 running a global discovery client 125 and a cloud-assisted GDS 110. The OT network 113 can include an Ethernet network, a RS485 network, or other suitable types of computer network. The edge device 123 can include a computing device suitable for executing instructions to provide the global discovery client 125 and the cloud-assisted GDS 110. In certain embodiments, the edge device 123 can include a desktop computer. In other embodiments, the edge device 123 can include a rack-mounted computer, a PLC or DCS supervisory control station, or other suitable types of computing device.

The OPC servers 124 can individually include a sensor, a PLC or DCS output module, or other suitable types of devices configured to provide data (e.g., as measurements of process variables) to one or more OPC clients 126. For instance, an OPC server 124 can include a pressure transmitter, a flow meter, a temperature transmitter, or other suitable types of transmitter configured according to OPC UA standards. In another example, an OPC server 124 can also include an RTU, a PLC, a DCS, or other suitable types of controller configured according to OPC UA standards. One suitable OPC server 124 can include a Rosemount 3051 pressure transmitter provided by Emerson Automation Solutions of Houston, Tex.

The OPC clients 126 can individually include a computing device and/or a software component configured according to the OPC UA standards to consume data from and send commands to one or more OPC servers 124. For example, OPC clients 126 can include one or more SCADA, RTU, PLC, DCS, or other suitable process control/monitoring systems. One example OPC client 126 can include Universal Data Connector provided by Open Automation Software of Lakewood, Colo. As described in more detail below, the individual OPC clients 126 can be configured to discover OPC servers 124 not only in the same factory 120 but also from other factories 120 via the cloud-assisted GDS 110 implemented in the cloud computing system 100. As such, the OPC clients 126 can present a globalized view of processing variables from factories 120 located in geographically diverse areas.

The global discovery client 125 can be configured to provide suitable interfaces to the OPC servers/clients 124 and 126 according to, for instance, the OPC UA standards. In certain embodiments, the global discovery client 125 can connect the OPC servers 124 and the cloud-assisted GDS 110. For example, the global discovery client 125 can be configured to initiate a discovery process by transmitting a request (not shown in FIG. 3) to the cloud-assisted GDS 110 at the edge device 123. Upon receiving the request, the cloud-assisted GDS 110 can query the cloud device registry 152 and obtain a list of registered OPC servers 124 from the first factory 120a and from other factories 120b-120n, and return the list to the OPC client 126. The list can also include any stored server configuration 162 of the OPC servers 124.

Using the list and the server configuration 162, the OPC clients 126 can establish a communication connection with one or more of the OPC servers 124 via suitable protocols such as those described in the OPC UA standards. In one example, the OPC client 126 can establish a local connection with an OPC server 124 in the same factory 120. In another example, the OPC client 126 in the first factory 120a can establish a communication connection with an OPC server 124 in a second factory 120b via, for instance, the cloud-assisted GDS 110 at the edge device 123 of each of the factories 120a and 120b. The cloud-assisted GDS 110 at each edge device 123 can facilitate establishing such communication connections by receiving and forwarding connection requests/responses, and/or perform other suitable operations. As such, the OPC client 126 in the first factory 120a can obtain a broadened or "globalized" view of status of additional factories 120 instead of only a local view.

As shown in FIG. 3, the cloud computing system 100 can host a cloud device registry 152, a cloud certificate authority 154, and an administration shell 158 operatively coupled to one another via, for example, the virtual networks 146 of FIG. 2. Though particular components are shown for illustration purposes in FIG. 3, in other embodiments, the cloud computing system 100 can also include additional and/or different components configured to facilitate operations of the cloud-assisted GDS 110. For example, as shown in FIG. 3, the cloud computing system 100 can also provide a cloud hub 159 configured to establish and maintain the secure connection 127 with the cloud-assisted GDS 110. The cloud hub 159 can include any suitable cloud services configured to provide device-to-cloud and cloud-to-device communications. In one example implementation, the cloud hub 159 can be implemented using Microsoft Azure IoT hub or secure (e.g., https) Representational State Transfer (REST). In other implementations, the cloud hub 159 can be implemented using, e.g., AWS IoT Service, Google Cloud IoT, or other suitable types of cloud IoT services. In yet further implementations, one or more of the cloud device registry 152, the cloud certificate authority 154, or the administration shell 158 can be accessed by the cloud-assisted GDS 110 without passing through the cloud hub 159. In further embodiments, the cloud device registry 152, the cloud certificate authority 154, and/or the administration shell 158 can also be a component of the cloud-assisted GDS 110, or one or more components of the cloud-assisted GDS 110 can be hosted in the cloud computing system 100.

The cloud device registry 152 can be configured to manage records of OPC server configuration 162 (shown in FIG. 4) of any OPC servers 124 registered with the cloud-assisted GDS 110. In certain embodiments, the cloud device registry 152 can include a centralized database (e.g., an SQL database or Microsoft Azure® IoT Hub device twins) and corresponding applications and cloud services (or microservices) for receive, store, organize, or otherwise manage the records of the OPC server configuration 162. In other embodiments, the cloud device registry 152 can also include distributed databases and/or other suitable data storage components for providing the foregoing functionalities.

The cloud certificate authority 154 can include a software component configured to issue digital certificates. A digital certificate certifies ownership of a public key by a named subject (e.g., an OPC server 124) of the certificate. The digital certificate allows others (e.g., an OPC client 126) to rely upon digital signatures or on assertions made about a private key that corresponds to the certified public key. As such, the cloud certificate authority 154 can act as a trusted intermediary to both an owner (e.g., an OPC server 124) of a certificate and to a party (e.g., an OPC client 126) relying upon the certificate. In a particular example implementation, the cloud certificate authority 154 can be implemented using Microsoft Azure® Key Vault for secure key management to sign certificates and/or encrypt data using keys stored in hardware security modules (HSMs).

The administration shell 158 can be configured to provide a facility for an administrator 102 to manage various aspects of the OPC networks 104 in the individual factories 120. For example, in one embodiment, the administration shell 158 can be configured to provide a user interface, for example, as a web page 111 on the client device 103. The web page 111 can display a list of OPC servers 124 requesting to be registered to the cloud-assisted GDS 110. The web page 111 can also provide facilities (e.g., selection buttons, check boxes, etc.) for the administrator 102 to grant, deny, or otherwise manage such requests. In other embodiments, the administration shell 158 can also be configured to provide operating status or other suitable information of the cloud-assisted GDS 110 to the administrator 102.

The cloud-assisted GDS 110 can be configured to execute instructions for implementing various business logics to facilitate device registration, authentication, or other suitable operations related to the factory OT network 113. As shown in FIG. 3, the cloud-assisted GDS 110 can include a registration component 151, a certificate component 153, an update component 155, and a secure network interface 157 operatively coupled to one another. In certain embodiments, the interface 157 can include a Secure Network Interface Board or other suitable hardware components. In other embodiments, the interface 157 can also include a software component implementing one or more of certification or cross-checking of Address Resolution Protocol (ARP) responses, Access Control List (ACL), or other security measures. Even though particular components are shown in FIG. 3, in other embodiments, the cloud-assisted GDS 110 can also include network interface components, input/output components, and/or other suitable components. In further embodiments, one or more of the registration, certificate, or update component 151, 153, and 155 may be hosted on one or more of the hosts 106 (FIG. 1) of the cloud computing system 100.

The registration component 151 can be configured to receive registration requests from the OPC servers 124, forwarding the registration requests to the cloud device registry 152, via the interface 157, for further processing, and provide responses to the registration requests to the OPC servers 124 via the secure connection 127. The certificate component 153 can be configured to facilitate digital certificate issuance, renewal, updates, or other suitable operations by the cloud certificate authority 154. The update component 155 can be configured to facilitate updating a list of registered and/or authorized devices (e.g., OPC servers 124) to the OPC servers 124.

In operation, the cloud-assisted GDS 110 can receive various service requests from the OPC servers 124 and/or OPC clients 126. In response, the registration, certificate, and update components 151, 153, and 155 of the cloud-assisted GDS 110 can relay certain requests/responses to/from the cloud device registry 152 and/or the cloud certificate authority 154 for performing registration, certificate pull/push, trust list pull/push, OPC server query, or other suitable operations. Functionalities and operations of the foregoing components 151, 153, and 155 of the cloud-assisted GDS 110 are described in more detail below with reference to FIGS. 4-9.

Figure 4:
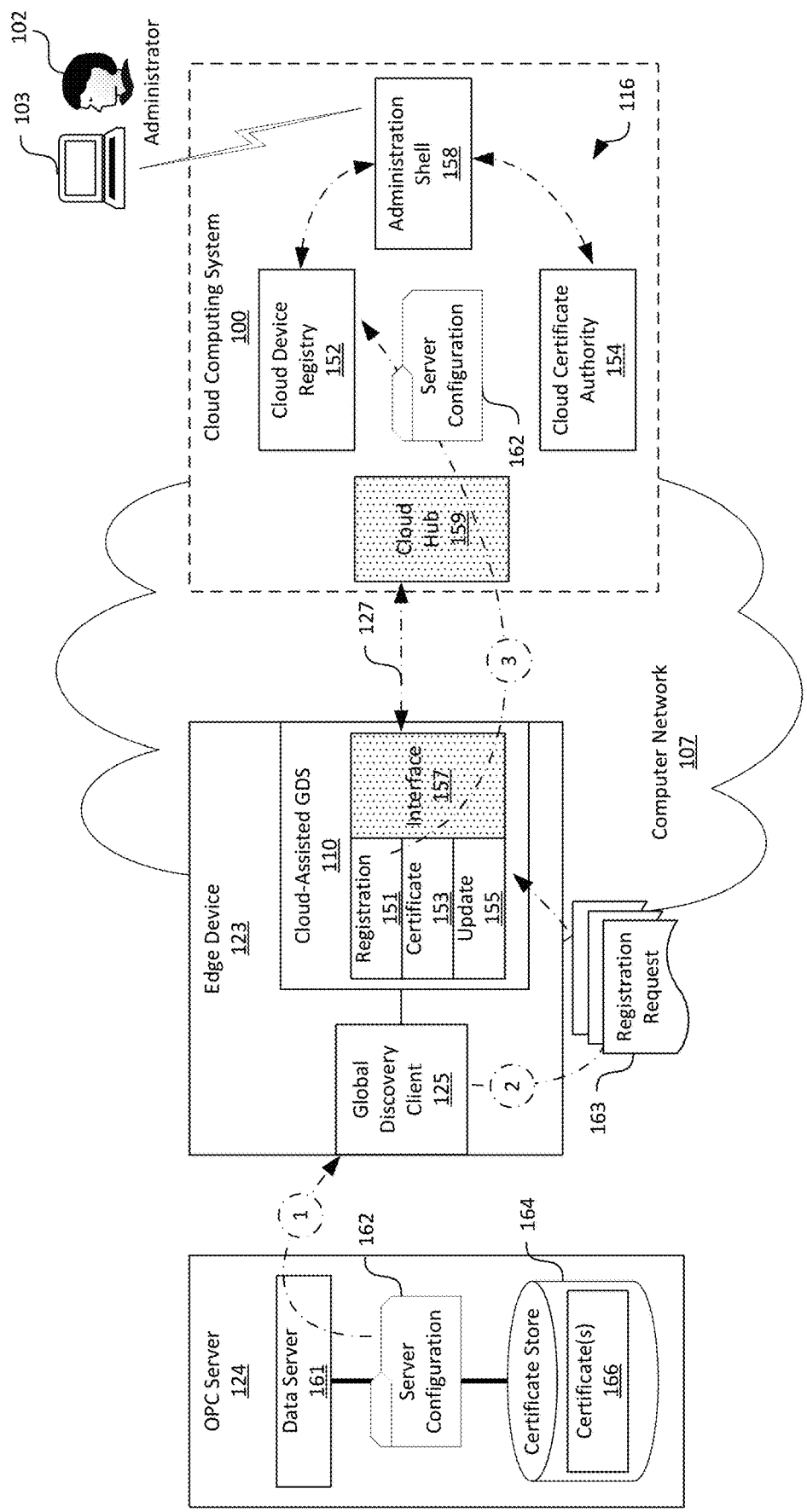
FIG. 4 is a schematic diagram illustrating certain components of the global discovery server in FIG. 3 during a device registration process in accordance with embodiments of the disclosed technology.

FIG. 4 is a schematic diagram illustrating certain components of the cloud-assisted GDS 110 during a device registration process of an OPC server 124 in accordance with embodiments of the disclosed technology. In FIG. 4 and other figures herein, numerals shown in circles represent certain operation stages for a corresponding process.

As shown in FIG. 4, the OPC server 124 can include a data server 161 configured to provide a stream of data to OPC clients 126 upon authentication. The data server 161 can include a digital processor with suitable firmware, an application specific integrated circuit ("ASIC"), or other suitable hardware/software components. The OPC server 124 can also include volatile or non-volatile memory storing server configuration 162 and a certificate store 164 containing one or more digital certificates 166. The server configuration 162 can include various types of information regarding components and/or configuration of the components in the OPC server 124. For example, the server configuration 162 can include data representing a data format, a data transmission rate, a device model, or other suitable information. The certificates 166 can include digital certificates 166 signed by the cloud certificate authority 154, public certifies of the cloud-assisted GDS 110, self-signed digital certificates, or other suitable types of certificates. Processes for obtaining digital certificates 166 signed by the cloud certificate authority 154 are described in more detail below with reference to FIGS. 5 and 6.

In operation, the registration component 151 of the cloud-assisted GDS 110 can be configured to facilitate registration of the OPC server 124 with the cloud device registry 152. For example, as shown in FIG. 4, the global discovery client 125 can monitor and detect that the OPC server 124 is connected via the OT factory network 113 (FIG. 3). Upon detecting the connected OPC server 124, the global discovery client 125 can query and read data representing server configuration 162 from the OPC server 124 (shown as stage 1) and transmit a registration request 163 (shown as stage 2) for registering the OPC server 124 to the cloud-assisted GDS 110. In turn, the registration component 151 of the cloud-assisted GDS 110 can transmit the registration request 163 along with the server configuration 162 to the cloud device registry 152 (shown as stage 3) via the secure connection 127 and the cloud hub 159.

The cloud device registry 152 can then cooperate with the administration shell 158 to request approval of the registration request 163 by the administrator 102 via, for example, the web page 111 of FIG. 3. Upon approval by the administrator 102 via the administration shell 158, the cloud device registry 152 can register the OPC server 124 and store corresponding server information 162 in a cloud storage (not shown) at the cloud computing system 100. The stored server information 162 can then be available for discovery by OPC clients 126 at the same or different factories. Once discovered, the OPC clients 126 can establish a communication connection with the registered OPC server 124 and receive process data streamed from the OPC server 124. Example process data can include measurement of process variables such as pressures, temperatures, liquid levels, flow rates, pump/fan outputs, etc.

Figure 5:
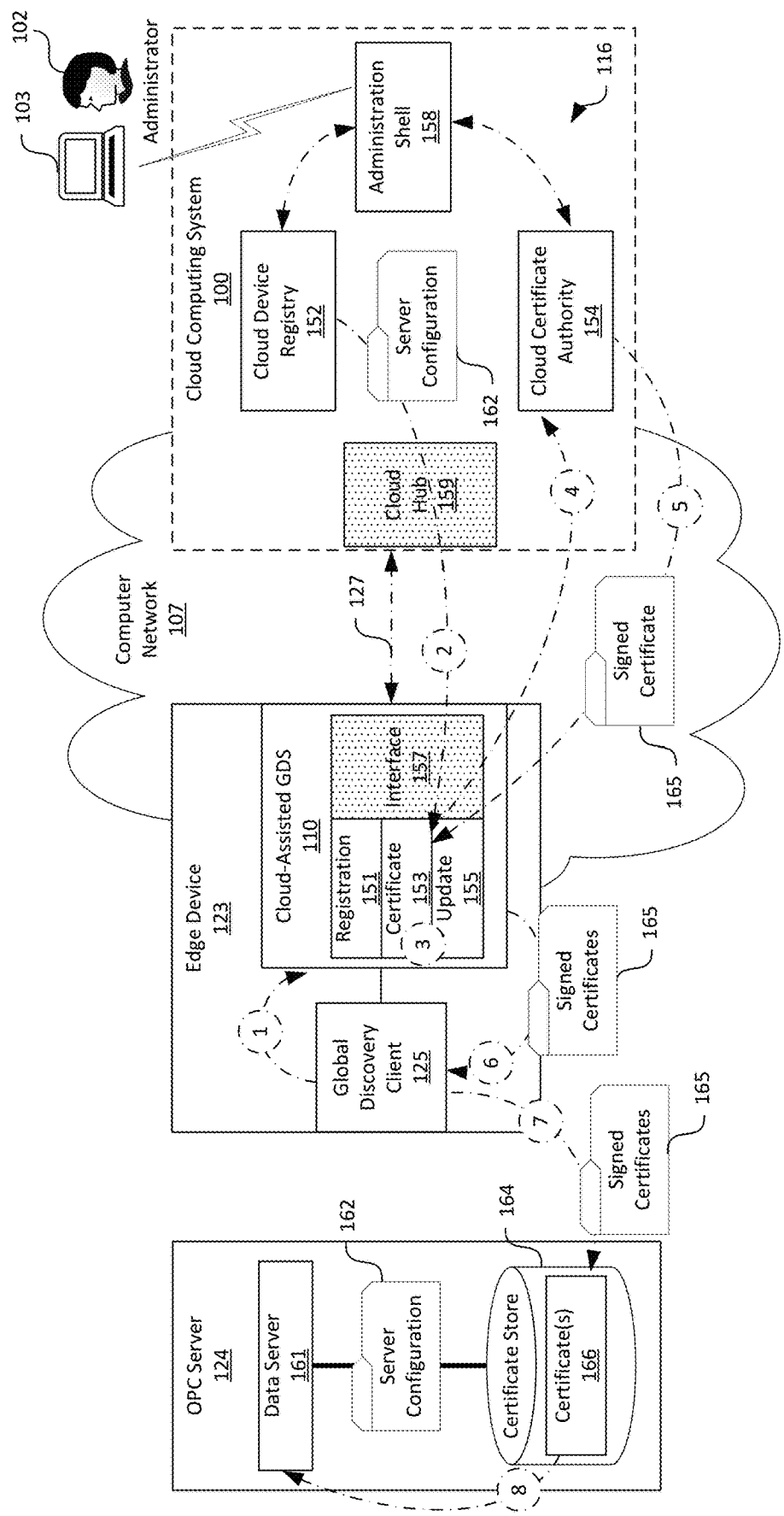
FIG. 5 is a schematic diagram illustrating certain components of the global discovery server in FIG. 3 during a client pull certificate process in accordance with embodiments of the disclosed technology.

Once registered, the cloud-assisted GDS 110 can facilitate obtaining digital certificates 166 signed by the cloud certificate authority 154 to the OPC server 124 for authentication with one or more OPC clients 126 (FIG. 3). FIG. 5 is a schematic diagram illustrating certain components of the cloud-assisted GDS 110 during a client pull certificate process in accordance with embodiments of the disclosed technology. As shown in FIG. 5, the global discovery client 125 can initially transmit a certificate request (not shown) for creating a digital certification for the OPC server 124 to the cloud-assisted GDS 110 (shown as stage 1). In response, the certificate component 153 of the cloud-assisted GDS 110 can retrieve the server configuration 162 of the registered OPC server 124 from the cloud device registry 152 (shown as stage 2) via the secure connection 127 and the cloud hub 159.

The certificate component 153 can also create a key pair containing a public key and a private key (shown as stage 3) or request a newly signed certificate and key pair directly from the cloud certificate authority 154. The certificate component 153 can then request the cloud certificate authority 154 to sign the certificate (shown as stage 4). Upon obtaining the signed certificate 165 from the cloud certificate authority 154 (shown as stage 5), the certificate component 153 can provide the signed certificate 165 and a public certificate (not shown) of the cloud-assisted GDS 110 to the global discovery client 125 (shown as stage 6). The global discovery client 125 can in turn store the received signed certificate 165 and the public certificate in the certificate store 164 of the OPC server 124 for access by the data server 161 (shown as stage 7). The data server 161 can then load the stored signed certificate 165 and/or public certificate from the certificate store 164, as needed (shown as stage 8).

Figure 6:
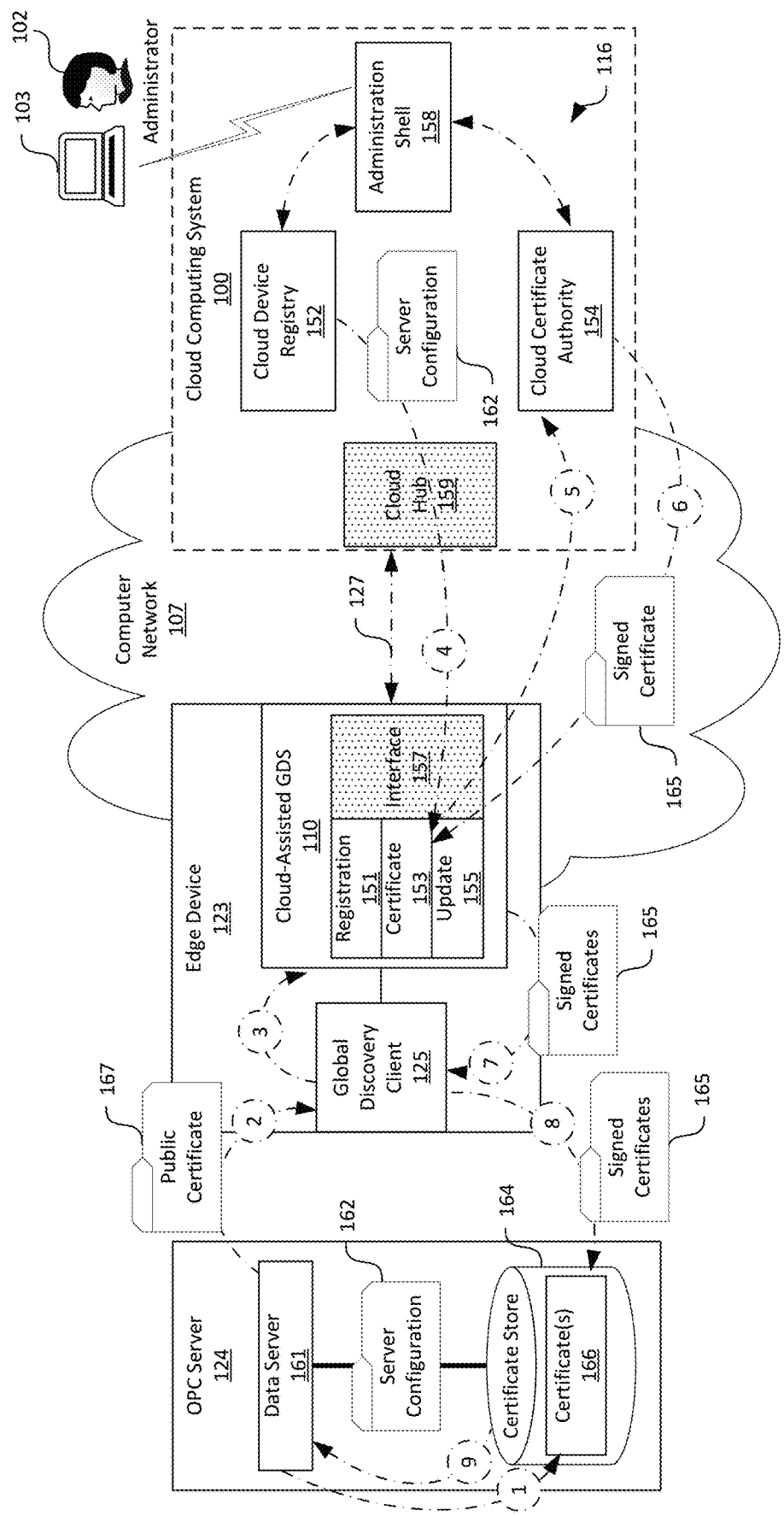
FIG. 6 is a schematic diagram illustrating certain components of the global discovery server in FIG. 3 during another client pull certificate process in accordance with embodiments of the disclosed technology.

FIG. 6 is a schematic diagram illustrating certain components of the cloud-assisted GDS 110 during another client pull certificate process in accordance with embodiments of the disclosed technology. As shown in FIG. 6, the OPC server 124 can create a key pair (shown as stage 1) and store the created key pair in the certificate store 164. The OPC server 124 can then use the created key pair to generate self-signed digital certificates 167. The global discovery client 125 can then read a public certificate (not shown) and a private key of the OPC server 124 from the certificate store 164 as well as a certificate signing request using the server configuration 162 (shown as stage 2).

The global discovery client 125 can then transmit the certificate signing request (not shown) to the cloud-assisted GDS 110 for requesting the cloud certificate authority 154 for a signed certificate 165 (shown as stage 3). In response to receiving the certificate request, the cloud-assisted GDS 110 can read the server configuration 162 of the OPC server 124 from the cloud device registry 152 (shown as stage 4) before transmitting a request to the cloud certificate authority 154 for the signed certificate 165 (shown as stage 5). Upon authentication, the cloud certificate authority 154 can then sign the certificate 165 and return a copy of the signed certificate 165 to the certificate component 153 via the secure connection 127 (shown as stage 6), which in turn provides the signed certificate 165 to the global discovery client 125 (shown as stage 7). The global discovery client 125 can then store the signed certificates 165 in the certificate store 164 of the OPC server 164 (shown as stage 8). Thus, the OPC server 124 can now replace the self-signed certificates 167 with the signed certificates 165 by the cloud certificate authority 154 when loading a digital certificate (shown as stage 9). In other implementations, the global discovery client 125 can also be configured to update the certificates 166 in the certificate store 164 via the "Update-Certificate" method.

Figure 7:
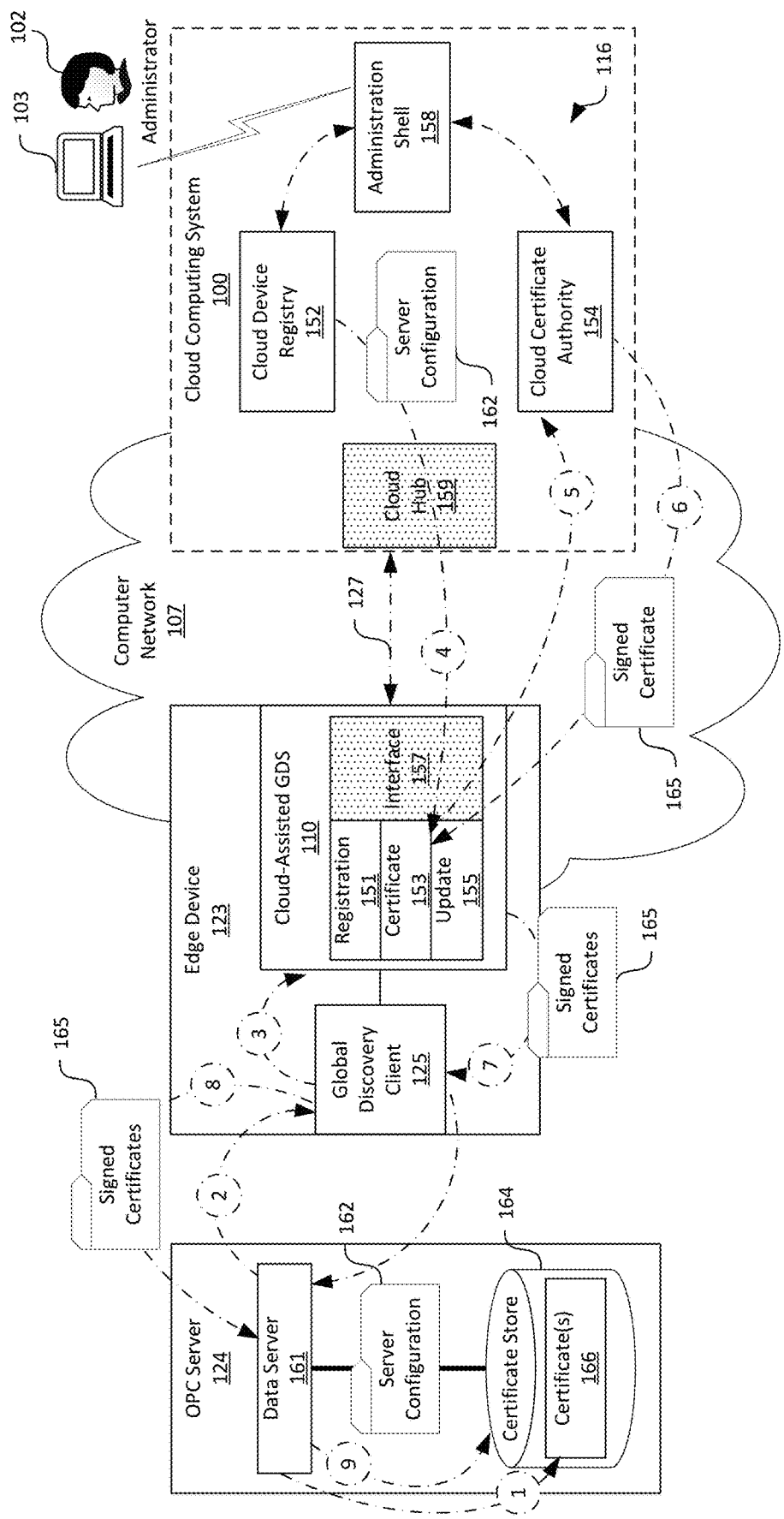
FIG. 7 is a schematic diagram illustrating certain components of the global discovery server in FIG. 3 during a server push certificate process in accordance with embodiments of the disclosed technology.

FIG. 7 is a schematic diagram illustrating certain components of the global discovery sever 110 during a server push certificate process in accordance with embodiments of the disclosed technology. The operations of a server push certificate process can include certain operations generally similar to those described above with reference to FIG. 6 (e.g., stages 1-7) except that the global discovery client 125 can push the signed certificates 165 to the OPC server 124 (shown as stage 8) using the server configuration 162, which in turn updates the self-signed certificates 167 in the certificate store 164 (shown as stage 9).

Figure 8:
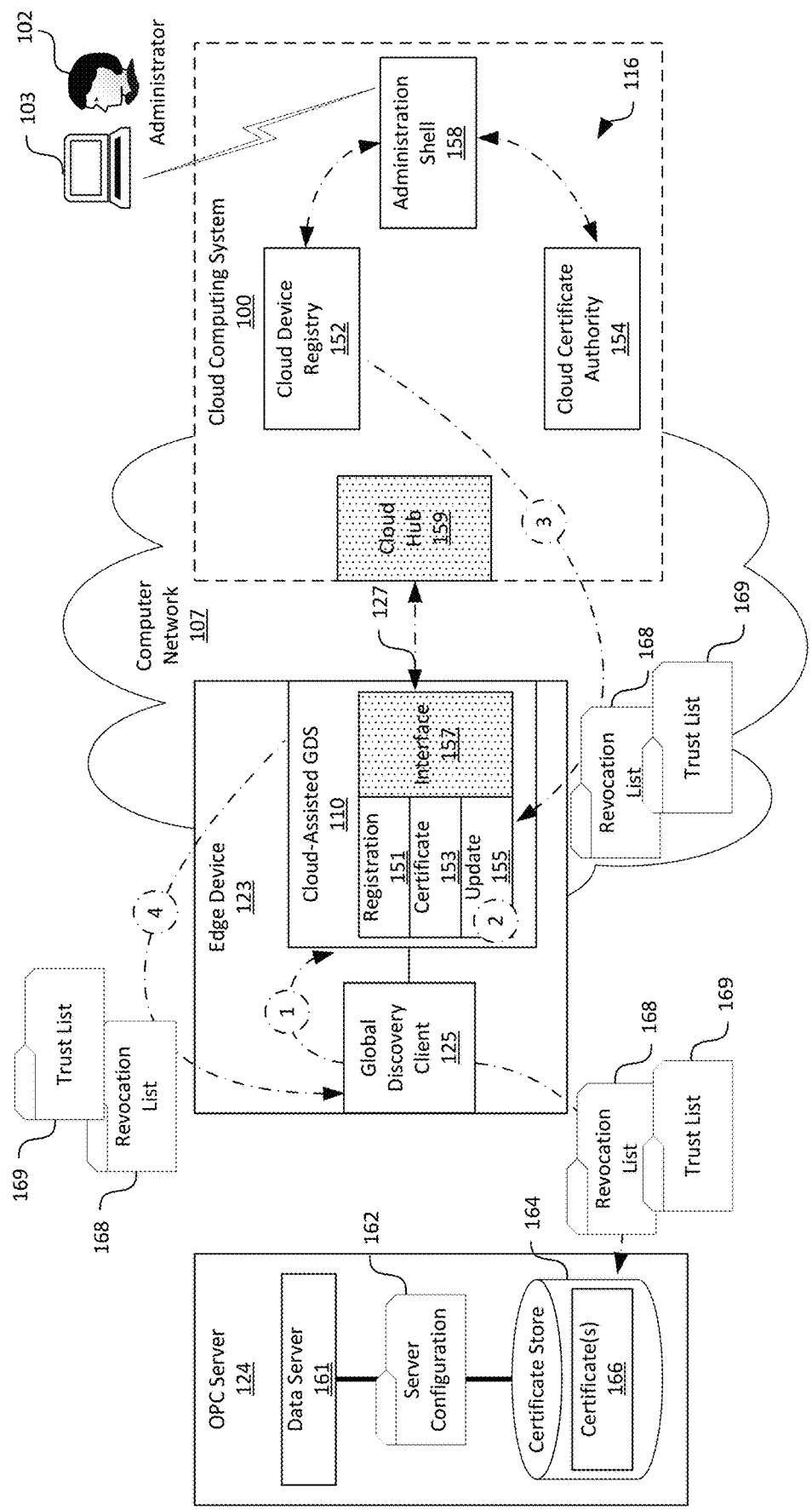
FIG. 8 is a schematic diagram illustrating certain components of the global discovery server in FIG. 3 during a client pull trust list process in accordance with embodiments of the disclosed technology.

FIG. 8 is a schematic diagram illustrating certain components of the cloud-assisted GDS 110 during a client pull trust list process in accordance with embodiments of the disclosed technology. As shown in FIG. 8, the global discovery client 125 can transmit a request (not shown) for updating a trust list of OPC servers 124 and/or OPC clients 126 to the cloud-assisted GDS 110 (shown as stage 1). The update component 155 of the cloud-assisted GDS 110 can then read a certificate revocation list 168 and a trust list 169 stored in the cloud computing system 100 (shown as stage 2 and 3). The certificate revocation list 168 and/or the trust list 169 can be generated based on, for example, an elapsed time since a certificate has been issued, input from the administrator 102, or other suitable criteria. The certificate revocation list 168 and the trust list 169 can contain data representing a list of OPC servers 124 or OPC clients 126 whose certificates have been revoked by the cloud certificate authority 154, and a list of OPC servers 124 or OPC clients 126 whose certificates are still in effect, respectively, as well as certificates in the trust list 169. The update component 155 of the cloud-assisted GDS 110 can then provide a copy of the trust list 169 and the certificate revocation list 168 to the global discovery client 125 (shown as stage 4), which in turn merges and updates the trust list 169 and the certificate revocation list 168 in the certificate store 164 of the OPC server 124 (shown as stage 5) or using server configuration 162 to access the certificates and/or trust list 169.

Figure 9:
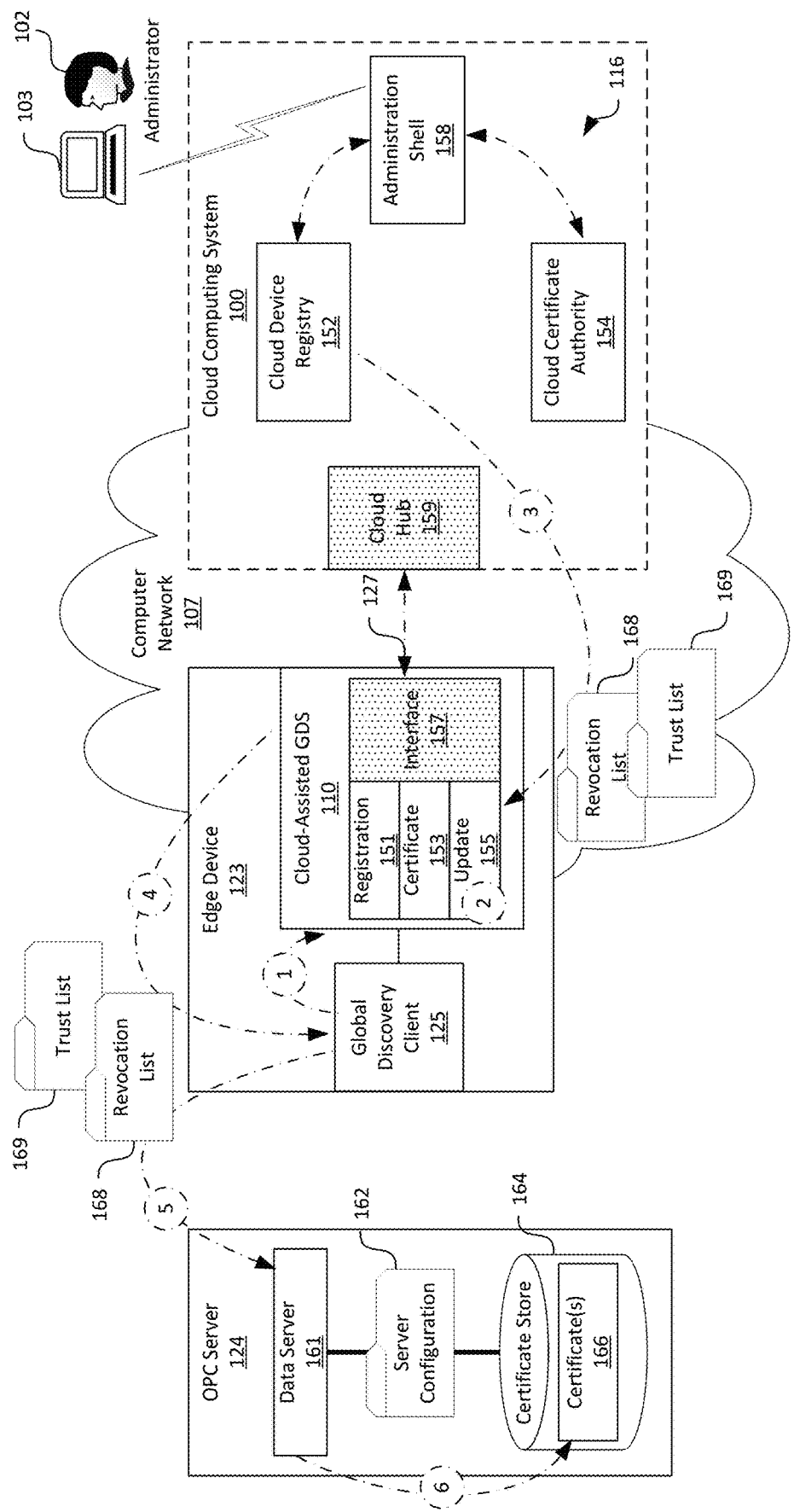
FIG. 9 is a schematic diagram illustrating certain components of the global discovery server in FIG. 3 during a server push trust list process in accordance with embodiments of the disclosed technology.

FIG. 9 is a schematic diagram illustrating certain components of the cloud-assisted GDS 110 during a server push trust list process in accordance with embodiments of the disclosed technology. The operations of a server push trust list process can include certain operations generally similar to those described above with reference to FIG. 8 (e.g., stages 1-5) except that the global discovery client 125 can using the server configuration 162 to push the retrieved the trust list 169 and the certificate revocation list 168 to the OPC server 124, which in turn updates the corresponding lists in the certificate store 164 (shown as stage 6).

Figure 10:
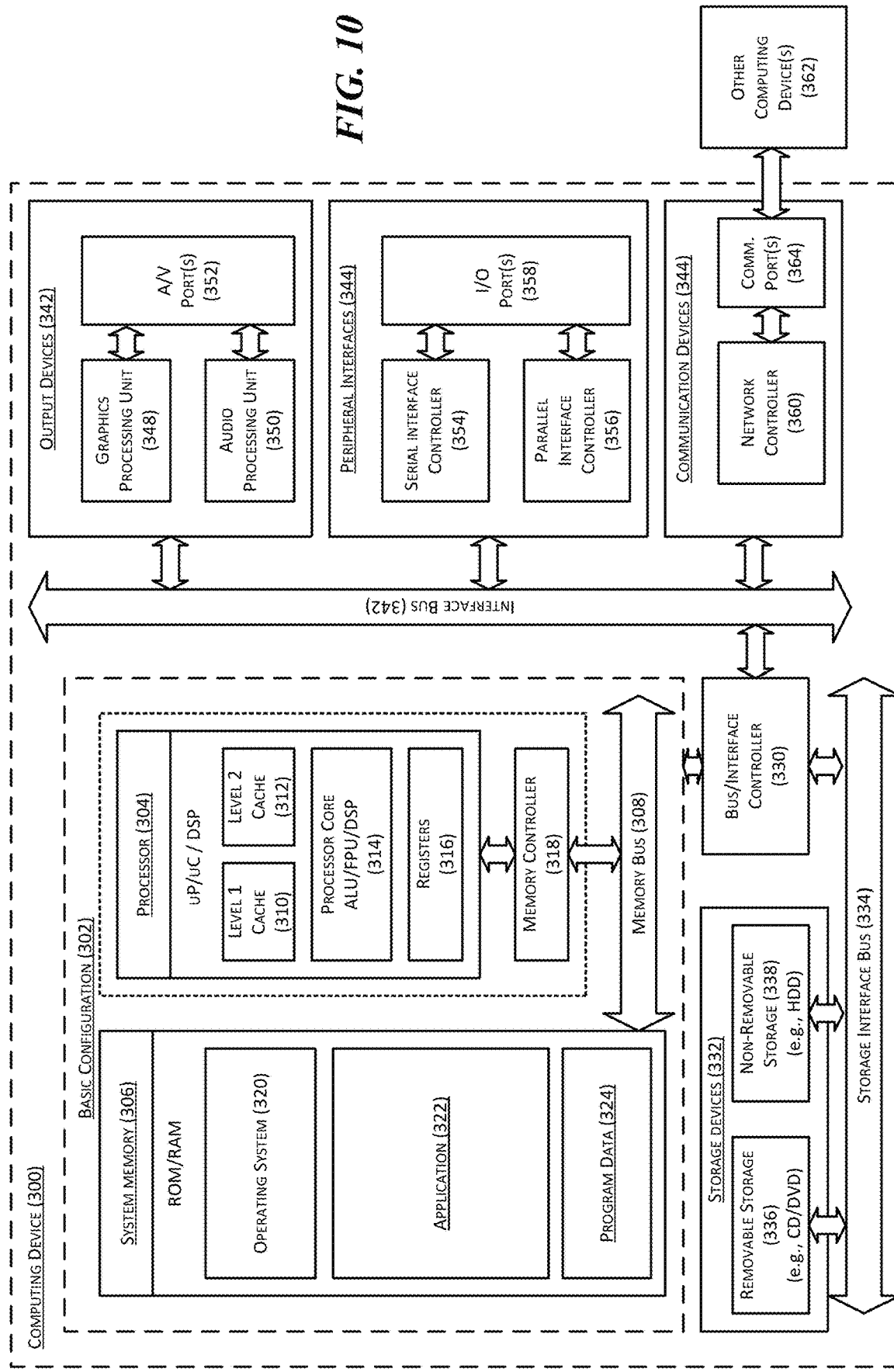
FIG. 10 is a computing device suitable for certain components of the cloud computing system in FIG. 1 or the global discovery server in FIGS. 3-9.

FIG. 10 is a computing device 300 suitable for certain components of the cloud computing system 100 in FIG. 1. For example, the computing device 300 can be suitable for the client devices 102, hosts 106, or the cloud-assisted GDS 110 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 10 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include trusted platform modules (TPMs), hardware security module (HSMs), magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

Specific embodiments of the technology have been described above for purposes of illustration. However, various modifications can be made without deviating from the foregoing disclosure. In addition, many of the elements of one embodiment can be combined with other embodiments in addition to or in lieu of the elements of the other embodiments. Accordingly, the technology is not limited except as by the appended claims.

We claim:

1. A method for providing a cloud-assisted global discovery service in an operational technology ("OT") infrastructure having multiple communicatively connected processing plants individually having data servers interconnected by an OT network, the method comprising:
  upon detecting a data server in the processing plant is connected to an OT network of the processing plant,
    collecting, from the detected data server, data representing a configuration of the data server via the OT network; and
    transmitting a registration request containing the collected data to a cloud computing system via a secure connection to register the detected data server as a data source for the OT infrastructure; and
    receiving, from the cloud computing system, a registration confirmation that indicates that the configuration of the data server is stored in the cloud computing system and is discoverable by client devices at other processing plants in the OT infrastructure, thereby enabling the client devices not located in the same processing plant as the data server to discover and consume process data provided by the data server.

2. The method of claim 1 wherein:
  the configuration contains a data format used by the data server during data delivery; and
  the method further includes facilitating transmission of process data in the data format from the data server to the client device at the another processing plant in the OT infrastructure.

3. The method of claim 1, further comprising:
  receiving, from a client device in the processing plant, a request for a list of data servers available as data sources in the OT infrastructure; and in response to receiving the request,
forwarding the received request to the cloud computing system via the secure connection;
receiving a list of registered data servers in the OT infrastructure, at least one of which is from the other processing plant; and
forwarding the list of registered data servers to the client device.

4. The method of claim 1, further comprising:
receiving, from a client device in the processing plant, a request for a list of data servers available as data sources in the OT infrastructure; and
in response to receiving the request,
retrieving, from the cloud computing system via the secure connection a list of registered data servers containing corresponding configuration data, at least one of which is from the additional processing plant; and
facilitating establishing a communication channel with the data server located at the other processing plant according to the retrieved list.

5. The method of claim 1, further comprising:
receiving, from a client device in the processing plant, a request for a list of data servers available as data sources in the OT infrastructure; and
in response to receiving the request,
retrieving, from the cloud computing system via the secure connection a list of registered data servers containing corresponding configuration data, at least one of which is from the additional processing plant;
facilitating establishing a communication channel with the data server located at the other processing plant according to the retrieved list; and
transmitting process data representing measurements of a process variable from the data server to the client device at the another processing plant via the established communication connection, thereby enabling consumption of the process data by the client device at the another processing plant in the different geographical location.

6. A method for providing a cloud-assisted global discovery service in an operational technology ("OT") infrastructure having multiple communicatively connected processing plants individually having data servers interconnected by an OT network, the method comprising:
detecting, at an edge device in the OT network of a processing plant, that a data server is connected to the OT network;
in response to detecting the data server,
collecting, from the detected data server, data representing a configuration of the data server; and
transmitting, from the edge device, a registration request containing the collected data to a cloud computing system via a secure connection to register the detected data server as a data source, wherein, upon being registered, the configuration of the data server is stored in the cloud computing system and is discoverable by client devices at another processing plant in a different geographical location from the processing plant at which the data server is located; and
transmitting process data representing measurements of a process variable from the data server to one of the client devices at the another processing plant via a communication connection established via the edge device according to the discoverable data stored in the cloud computing system, thereby enabling discovery of the data server as a data source and consumption of the process data by the client device at the another processing plant in the different geographical location.

7. The method of claim 6, further comprising:
receiving, at the edge device, a registration confirmation from the cloud computing system via the secure connection, the registration confirmation indicating that the data server is registered with the discovery service provided by the cloud computing system; and
in response to receiving the registration confirmation,
transmitting, from the edge device, a certificate request to the cloud computing system for a digital certificate signed by a certificate authority hosted in the cloud computing system;
receiving, from the cloud computing system, the requested digital certificate signed by the certificate authority hosted in the cloud computing system; and
storing, by the edge device, the received digital certificate in a certificate store in the data server.

8. The method of claim 6, further comprising:
retrieving, at edge device, a certificate signing request generated by the data server; and
in response to retrieving the certificate signing request,
transmitting, from the edge device, a certificate request to the cloud computing system, the certificate request requesting a certificate authority hosted in the cloud computing system to sign the certificate signing request enclosed in the certificate request;
receiving, from the cloud computing system, the digital certificate signed by the certificate authority hosted in the cloud computing system; and
in response to receiving the digital certificate signed by the certificate authority, by the edge device, replacing the certificate signing request in a certificate store in the data server with the received digital certificate.

9. The method of claim 6, further comprising:
retrieving, at edge device, a certificate signing request generated by the data server; and
in response to retrieving the certificate signing request,
transmitting, from the edge device, a certificate request to the cloud computing system, the certificate request requesting a certificate authority hosted in the cloud computing system to sign the certificate signing request enclosed in the certificate request;
receiving, from the cloud computing system, the digital certificate signed by the certificate authority hosted in the cloud computing system; and
forwarding the received digital certificate signed by the certificate authority to the data server, wherein the data server replaces the certificate signing request in a certificate store in the data server with the received digital certificate in response to receiving the digital certificate signed by the certificate authority.

10. The method of claim 6, further comprising:
transmitting, from the edge device, an update request to the cloud computing system for updating a trust list of client devices;
receiving, at the edge device and from the cloud computing system, a certificate revocation list and a trust list containing data representing a list of client devices whose certificates have been revoked and a list of client devices whose certificates are still in effect, respectively; and
updating, by the edge device, a copy of the trust list and the certificate revocation list in a certificate store of the data server.

11. The method of claim 6, further comprising:
transmitting, from the edge device, an update request to the cloud computing system for updating a trust list of client devices;
receiving, at the edge device and from the cloud computing system, a certificate revocation list and a trust list containing data representing a list of client devices whose certificates have been revoked and a list of client devices whose certificates are still in effect, respectively; and
forwarding the received certificate revocation list and trust list to the data server, wherein the data server merges the received certificate revocation list and trust list with a copy of the certificate revocation list and the trust list in a certificate store of the data server.

12. The method of claim 6 wherein:
the configuration contains a data format used by the data server during data delivery; and
transmitting the process data includes transmitting the process data in the data format from the data server to one of the client devices at the another processing plant.

13. The method of claim 6, further comprising:
receiving, from a client device in the processing plant, a request for a list of data servers available as data sources; and
in response to receiving the request,
forwarding the received request to the cloud computing system via the secure connection;
receiving a list of registered data servers, at least one of which is from the additional processing plant; and
forwarding the list of registered data servers to the client device.

14. The method of claim 6, further comprising:
receiving, from a client device in the processing plant, a request for a list of data servers available as data sources; and
in response to receiving the request,
retrieving, from the cloud computing system via the secure connection a list of registered data servers containing corresponding configuration data, at least one of which is from the additional processing plant; and
facilitating establishing a communication channel with the data server located at the additional processing plant according to the retrieved list.

15. A computing device of a processing plant in an operational technology ("OT") infrastructure having multiple communicatively connected processing plants individually having data servers interconnected by an OT network, the computing device comprising:
a processor; and
a memory containing instructions executable by the processor to cause the computing device to:
upon detecting a data server is connected to the OT network in a processing plant,
collect, from the detected data server, data representing a configuration of the data server; and
transmit a registration request containing the collected data to a cloud computing system via a secure connection to register the detected data server as a data source in the OT infrastructure; and
receive, from the cloud computing system, a registration confirmation indicating that the configuration of the data server is stored in the cloud computing system and is discoverable by client devices at other processing plants in the OT infrastructure, thereby enabling the client devices not located in the same processing plant as the data server to discover and consume process data provided by the data server.

16. The computing device of claim 15 wherein the memory contains additional instructions executable by the processor to cause the computing device to receive and forward one or more connection requests and responses between a client device and the data server to establish a communication connection between the client device and the data server, the client device being at another processing plant different than the processing plant at which the data server is located.

17. The computing device of claim 15 wherein the memory contains additional instructions executable by the processor to cause the computing device to:
transmit, from the computing device, a certificate request to the cloud computing system, the certificate request requesting a certificate authority hosted in the cloud computing system to sign a certificate signing request enclosed in the certificate request;
receive, from the cloud computing system, the digital certificate signed by the certificate authority hosted in the cloud computing system; and
in response to receiving the digital certificate signed by the certificate authority, replace a copy of the certificate signing request in a certificate store in the data server with the received digital certificate.

18. The computing device of claim 15 wherein the memory contains additional instructions executable by the processor to cause the computing device to:
transmit a certificate request to the cloud computing system, the certificate request requesting a certificate authority hosted in the cloud computing system for a signed digital certificate;
receive, from the cloud computing system, the digital certificate signed by the certificate authority hosted in the cloud computing system; and
forward the received digital certificate signed by the certificate authority to the data server, wherein the data server replaces a certificate signing request in a certificate store in the data server with the received digital certificate signed by the certificate authority in response to receiving the digital certificate signed by the certificate authority.

19. The computing device of claim 15 wherein the memory contains additional instructions executable by the processor to cause the computing device to:
transmit an update request to the cloud computing system for updating a trust list of client devices;
receive, at the edge device and from the cloud computing system, a certificate revocation list and a trust list containing data representing a list of client devices whose certificates have been revoked and a list of client devices whose certificates are still in effect, respectively; and
update a copy of the trust list and the certificate revocation list in a certificate store of the data server.

20. The computing device of claim 15 wherein:
the configuration contains a data format used by the data server during data delivery; and
to transmit the process data includes to transmit the process data in the data format from the data server to one of the client devices at the another processing plant.

* * * * *